3,029,262
17β-(1'-ALKOXY-ETHYLIDENE-AMINO) STEROIDS
Pietro de Ruggieri, Carlo Ferrari, and Carmelo Gandolfi, Milan, Italy, assignors to Ormonoterapia Richter S.p.A., Milan, Italy
No Drawing. Filed Oct. 19, 1961, Ser. No. 146,361
Claims priority, application Italy Sept. 28, 1961
18 Claims. (Cl. 260—397.5)

This invention relates to the preparation of new and important steroids effective on the central nervous system as ganglioplegics and medulla depressants and therefore useful as hypotensive agents.

As starting materials for preparing the compounds of the invention, there have been employed the compounds of the formula

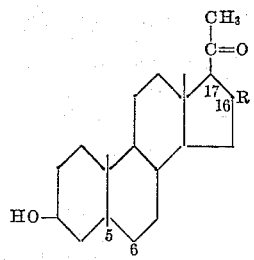

wherein the linkages between the 5 and 6 and 16 and 17 carbon atoms, respectively, are either single or double bonds, and R is hydrogen or an α- or β-oriented methyl group. It will be understood, of course, that when R is methyl and there is a double bond between carbon atoms 16 and 17, this methyl group will not be oriented. These compounds, for example, pregn-5-ene-3β-ol-20-one, 5α-pregnane-3β-ol-20-one, 16a-methyl-pregn-5-ene-3β-ol-20-one, 16β-methyl-pregn-5-ene-3β-ol-20-one, 16α-methyl-5α-pregnane-3β-ol-20-one, 16-methyl-pregna-5,16-diene-3β-ol-20-one, when reacted with an alcohol R'OH in which R' is a lower alkyl radical, particularly methyl or ethyl, and anhydrous hydrazoic acid in the presence of hydrogen chloride, are converted to 17-alkyl-acetimido-derivatives having the general formula

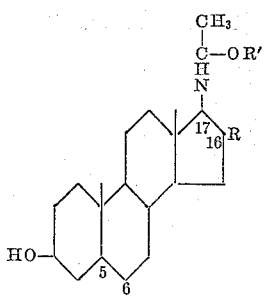

wherein the linkages between the 5 and 6 and 16 and 17 carbon atoms, respectively are either single or double bonds, R has the same meaning as above and R' is a lower alkyl group, preferably methyl or ethyl. These compounds have the stated utility but, if desired, the 3-hydroxyl group may be esterified without loss of activity. Conventional esterification procedures may be employed, preferably using a lower alkanoic acid or its anhydride, particularly acetic anhydride. When it is desired that the final product be an ester, it is also possible to use as the starting material a compound which has already been esterified in the 3-position.

The reaction may be carried out by dissolving the starting steroid compound and anhydrous hydrazoic acid in an inert organic solvent, such as chloroform, and mixing this solution with the appropriate alcohol saturated with gaseous hydrogen chloride. The reaction temperature is preferably kept between 0 and 30° C.

The following examples are set forth as illustrative of but not as limiting the invention:

*Example 1*

A solution consisting of 1 part pregn-5-ene-3β-ol-20-one in 10 parts of a 1.6 molar chloroform solution of anhydrous hydrazoic acid is added to 10 parts of a 27% ethanolic solution of gaseous HCl, at a temperature of about 0° C. After the addition, the solution is shaken for 1 hour at room temperature, then poured into 30 parts of a 40% aqueous solution of potassium carbonate.

The chloroform is partially removed, the solution is washed with water to neutrality, the solvent is evaporated completely in vacuum and the residue is crystallized from methanol. 0.8 part of 17β-(1'-ethoxy-ethylidene-amino)-androst-5-ene-3β-ol are obtained, M.P. 169–171.5° C.; $[\alpha]_D = -27°$, infrared maxima at 5.99μ, 8μ. Conventional acetylation with pyridine and acetic anhydride results in the 3-acetate, M.P. 132–133° C.; $[\alpha]_D = -28°$, infrared maxima at 2.78μ, 5.99μ 8.1μ.

Following this procedure and starting with 5α-pregnane-3β-ol-20-one, there was prepared 17β-(1'-ethoxy-ethylidene-amino)-5α-androstane-3β-ol, M.P. 174–176° C.; $[\alpha]_D = +46°$; infrared maxima at 5.98μ, 8.01μ and its 3-acetate, M.P. 129–131° C.; $[\alpha]_D = +41°$; infrared maxima at 5.78μ, 5.98μ, and 8.1μ.

From 16α-methyl-pregn-5-ene-3β-ol-20-one, there was prepared 16α-methyl-17β(1'-ethoxy-ethylidene-amino)-androst-5-ene-3β-ol, M.P. 174–176° C.; $[\alpha]_D = -51°$; infrared maxima at 4.78μ, 5.97μ, 8μ.

From 3β-acetoxy-16β-methyl-pregn-5-ene-20-one, there was prepared 3β-acetoxy-16β-methyl-17β-(1'-ethoxy-ethylidene-amino)-androst-5-ene, M.P. 126–129° C; $[\alpha]_D = +8°$; infrared maxima at 5.78μ, 5.98μ, 8μ.

From 3β-acetoxy-16β-methyl-5α-pregnane-20-one, there was prepared 3β-acetoxy-16β-methyl-17β-(1'-ethoxy-ethylidene-amino)-5α-androstane, M.P. 131–132° C.; $[\alpha]_D = +23°$; infrared maxima at 5.78μ, 5.98μ, 8μ.

From 16α-methyl-5α-pregnane-3β-ol-20-one, there was prepared 16α-methyl-17β-(1'-ethoxy-ethylidene-amino)-5α-androstane-3β-ol, M.P. 157–159° C.; $[\alpha]_D = +15°$, infrared maxima at 5.98μ, 8.01μ and its 3-acetate, M.P. 155–157° C., $[\alpha]_D = +11°$; infrared maxima at 5.75μ, 5.97μ, 8μ.

From 16-methyl-pregna-5,16-diene-3β-ol-20-one, there was prepared 16-methyl-17-(1'-ethoxy-ethylidene-amino)-androsta-5,16 diene-3β-ol, M.P. 148–150° C.; $[\alpha]_D = -143°$; infrared maxima at 6.02μ, 6.19μ, 8μ.

*Example 2*

Following the procedure outlined in Example 1 but using methanol instead of ethanol, 17β-(1'-methoxy-ethylidene-amino)-androst-5-ene-3β-ol is obtained from pregn-5-ene-3β-ol-20-one, M.P. 166–169° C.; $[\alpha]_D = -25°$; infrared maxima at 5.99μ, 8μ.

By the conventional esterification reaction also described in Example 1, there is obtained the 3-acetate, M.P. 135–138° C.; $[\alpha]_D = -25°$, infrared maxima at 5.75μ, 5.98μ, 8.1μ.

From 16α-methyl-5α-pregnane-3β-ol-20-one, there was prepared 16α-methyl-17β-(1'-methoxy-ethylidene-amino)-5α-androstane-3β-ol, M.P. 155–158° C.; [α]_D=+18°; infrared maxima 5.98μ, 8.01μ and its 3-acetate, M.P. 173–174° C.; [α]_D=+17°; infrared maxima 5.75μ, 5.97μ, 8.01μ.

From 16-methyl-pregna-5,16-diene-3β-ol-20-one there was prepared 16 - methyl - 17 - (1'-methoxy-ethylidene-amino) - androsta-5,16-diene-3β-ol, M.P. 193–196° C., [α]_D=−153°, infrared maxima at 6.02μ, 6.19μ, 8μ.

The present compounds may be mixed with conventional pharmaceutical carriers, either liquid or solid and administered orally. In association with a sterile, non-pyrogenic liquid carrier, they are also suitable for parenteral administration.

The present application is a continuation-in-part of our co-pending application Serial No. 75,091 filed December 12, 1960, now abandoned.

We claim:

1. A process of preparing compounds having the formula

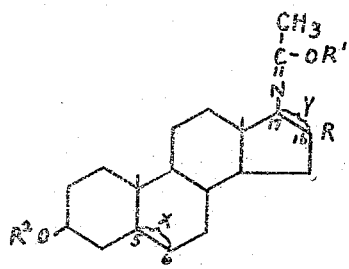

wherein X and Y are each selected from the group consisting of single and double bonds, R is a member selected from the group consisting of hydrogen, an α-methyl group and a β-methyl group, R' is a lower alkyl group, and R² is a member selected from the group consisting of hydrogen and an acyl radical derived from a lower alkanoic acid, which process comprises reacting in an inert organic solvent in the presence of hydrogen chloride, a compound of the formula

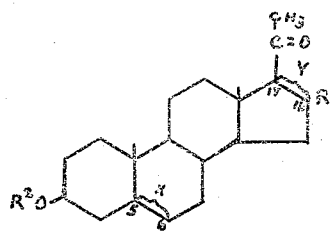

wherein X, Y, R and R² have the same meaning as above with anhydrous hydrazoic acid and an alcohol R'OH in which R' has the same meaning as above.

2. Compounds having the formula

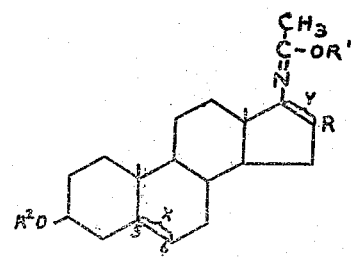

wherein X and Y are each selected from the group consisting of single and double bonds, R is a member selected from the group consisting of hydrogen, an α-methyl group and β-methyl group, R' is a lower alkyl group, and R² is a member selected from the group consisting of hydrogen and an acyl radical derived from a lower alkanoic acid.

3. 17β - (1' - ethoxy-ethylidene-amino)-androst-5-ene-3β-ol.

4. 3β - acetoxy - 17β - (1' - ethoxy-ethylidene-amino)-androst-5-ene.

5. 17β - (1'-methoxy-ethylidene-amino)-androst-5-ene-3β-ol.

6. 3β - acetoxy - 17β - (1'-methoxy-ethylidene-amino)-androst-5-ene.

7. 17β - (1' - ethoxy-ethylidene-amino)-5α-androstane-3β-ol.

8. 3β - acetoxy - 17β-(1'-ethoxy-ethylidene-amino)-5α-androstane.

9. 3β - acetoxy - 16β-methyl-17β-(1'-ethoxy-ethylidene-amino)-androst-5-ene.

10. 3β - acetoxy-16β-methyl-17β-(1'-ethoxy-ethylidene-amino)-5α-androstane.

11. 16α - methyl - 17β-(1'-ethoxy-ethylidene-amino)-androst-5-ene-3β-ol.

12. 3β - acetoxy-16α-methyl-17β-(1'-ethoxy-ethylidene-amino)-androst-5-ene.

13. 16α - methyl-17β-(1'-ethoxy-ethylidene-amino)-5α-androstane-3β-ol.

14. 3β - acetoxy-16α-methyl-17β-(1'-ethoxy-ethylidene-amino)-5α-androstane.

15. 16α - methyl - 17β-(1'-methoxy-ethylidene-amino)-5α-androstane-3β-ol.

16. 3β - acetoxy - 16α - methyl-17β-(1'-methoxy-ethylidene-amino)-5α-androstane.

17. 16 - methyl - 17 - (1' - ethoxy - ethylidene-amino)-androsta-5,16-diene-3β-ol.

18. 16 - methyl - 17 - (1'-methoxy-ethylidene-amino)-androsta-5,16-diene-3β-ol.

None references cited.

UNITED STATES PATENT OFFICE
CERTIFICATION OF CORRECTION

Patent No. 3,029,262                                April 10, 1962

Pietro de Ruggieri et al.

It is hereby certified that error appears in the above numbered patent requiring correction and that the said Letters Patent should read as corrected below.

Column 1, lines 45 to 56, the formula should appear as shown below instead of as in the patent:

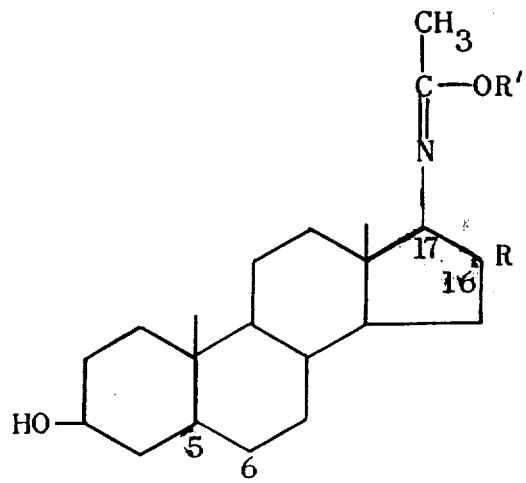

Signed and sealed this 9th day of October 1962.

(SEAL)
Attest:

ERNEST W. SWIDER                              DAVID L. LADD

Attesting Officer                               Commissioner of Patents